United States Patent
Harada et al.

(10) Patent No.: US 12,055,223 B2
(45) Date of Patent: Aug. 6, 2024

(54) VALVE DEVICE

(71) Applicant: DENSO CORPORATION, Kariya (JP)

(72) Inventors: Hiroyuki Harada, Kariya (JP); Yuushi Tsuduki, Kariya (JP); Noriyuki Inagaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 71 days.

(21) Appl. No.: 17/868,095

(22) Filed: Jul. 19, 2022

(65) Prior Publication Data

US 2022/0356949 A1    Nov. 10, 2022

Related U.S. Application Data

(63) Continuation of application No. PCT/JP2021/000517, filed on Jan. 8, 2021.

(30) Foreign Application Priority Data

Jan. 22, 2020 (JP) ................. 2020-008382

(51) Int. Cl.
| | |
|---|---|
| F16K 1/226 | (2006.01) |
| F02M 26/70 | (2016.01) |
| F16J 15/3272 | (2016.01) |
| F16J 15/44 | (2006.01) |

(52) U.S. Cl.
CPC ........... *F16K 1/2261* (2013.01); *F02M 26/70* (2016.02); *F16J 15/3272* (2013.01); *F16J 15/441* (2013.01)

(58) Field of Classification Search
CPC ..... F16J 15/3272; F02M 26/70; F16K 1/2261
See application file for complete search history.

(56) References Cited

U.S. PATENT DOCUMENTS

| | | | |
|---|---|---|---|
| 2009/0020099 A1 | 1/2009 | Bessho et al. | |
| 2009/0051124 A1* | 2/2009 | Kakehi | F16J 15/3272 277/581 |
| 2010/0001475 A1* | 1/2010 | Janian | F16J 15/441 267/1.5 |
| 2011/0037235 A1* | 2/2011 | Eguchi | F16J 15/3272 277/580 |
| 2017/0227130 A1 | 8/2017 | Kohlen et al. | |

(Continued)

FOREIGN PATENT DOCUMENTS

| | | |
|---|---|---|
| JP | 2016-211678 | 12/2016 |
| JP | 2019168012 | * 3/2019 |
| JP | 2019-105374 | 6/2019 |

*Primary Examiner* — Robert K Arundale
(74) *Attorney, Agent, or Firm* — Nixon & Vanderhye P.C.

(57) ABSTRACT

A seal ring of a valve element includes a one-end joint forming portion and an other-end joint forming portion. The one-end joint forming portion includes a one-end first contact portion and a one-end second contact portion located on one side of the one-end first contact portion in an axial direction and extending in a circumferential direction beyond the one-end first contact portion. The other-end joint forming portion includes an other-end first contact portion and an other-end second contact portion located on the other side of the other-end first contact portion in the axial direction and extending in the circumferential direction beyond the other-end first contact portion. An inner diameter of the seal ring when the one-end first contact portion separates from the other-end second contact portion is less than an outer diameter of the valve element.

9 Claims, 8 Drawing Sheets

(56) References Cited

U.S. PATENT DOCUMENTS

| | | | |
|---|---|---|---|
| 2018/0100586 A1* | 4/2018 | Ishigaki | F02M 26/54 |
| 2018/0258889 A1* | 9/2018 | Ishigaki | F16K 1/2268 |
| 2019/0063612 A1* | 2/2019 | Inagaki | F02M 26/70 |
| 2021/0018097 A1* | 1/2021 | Kakehi | F16K 1/2261 |

* cited by examiner

VALVE DEVICE

CROSS REFERENCE TO RELATED APPLICATION

The present application is a continuation application of International Patent Application No. PCT/JP2021/000517 filed on Jan. 8, 2021, which designated the U.S. and claims the benefit of priority from Japanese Patent Application No. 2020-008382 filed on Jan. 22, 2020. The entire disclosures of all of the above applications are incorporated herein by reference.

TECHNICAL FIELD

The present disclosure relates to a valve device configured to increase and decrease an opening degree of a fluid passage through which a fluid flows.

BACKGROUND

A valve device is configured as a butterfly valve. This valve device includes a housing defining a gas passage through which a gas flows, a valve element configured to open and close the gas passage by rotating in the gas passage, and an annular seal ring configured to seal a gap between an outer circumferential end of the valve element and an inner circumferential surface of the gas passage.

SUMMARY

A valve device includes a passage forming portion, a valve element, and an annular seal ring. The passage forming portion defines therein a fluid passage through which a fluid flows and includes a passage inner wall surface facing the fluid passage. The valve element is housed in the fluid passage and configured to open and close the fluid passage by rotating. The valve element has an outer circumferential end portion defining an outer circumferential groove. The annular seal ring is fit into the outer circumferential groove to seal a gap between the passage inner wall surface and the outer circumferential end portion of the valve element when the valve element fully closes the fluid passage. The seal ring includes, as a joint, a one-end joint forming portion and an other-end joint forming portion. The one-end joint forming portion and the other-end joint forming portion are slidably overlapped with each other to allow the seal ring to radially expand and contract. The one-end joint forming portion includes a one-end first contact portion and a one-end second contact portion located on one side of the one-end first contact portion in an axial direction of the seal ring and extending in a circumferential direction of the seal ring beyond the one-end first contact portion. The other-end joint forming portion includes an other-end first contact portion and an other-end second contact portion located on the other side of the other-end first contact portion in the axial direction and extending in the circumferential direction beyond the other-end first contact portion. The other-end first contact portion is configured to be in contact with the one-end second contact portion in a radial direction of the seal ring when the seal ring contracts. The other-end second contact portion is configured to be in contact with the one-end first contact portion in the radial direction and to be in contact with the one-end second contact portion in the axial direction when the seal ring contracts. The one-end first contact portion is configured to separate from the other-end second contact portion in the circumferential direction when the seal ring expands. An inner diameter of the seal ring at a timing the one-end first contact portion separates from the other-end second contact portion is less than an outer diameter of the outer circumferential end portion of the valve element.

Also, according to another aspect of the present disclosure, a valve device includes a passage forming portion, a valve element, an annular seal ring, and a tension ring. The passage forming portion defines therein a fluid passage through which a fluid flows and includes a passage inner wall surface facing the fluid passage. The valve element is housed in the fluid passage and configured to open and close the fluid passage by rotating. The valve element has an outer circumferential end portion defining an outer circumferential groove. The annular seal ring is fit into the outer circumferential groove to seal a gap between the passage inner wall surface and the outer circumferential end portion of the valve element when the valve element fully closes the fluid passage. The tension ring has an arc shape extending in a circumferential direction of the seal ring and biasing the seal ring in a direction to radially expand the seal ring. The seal ring defines a side groove recessed in an axial direction of the seal ring and extending in the circumferential direction. The tension ring is fit into the side groove. The seal ring includes, as a joint, a one-end joint forming portion and an other-end joint forming portion. The one-end joint forming portion and the other-end joint forming portion are slidably overlapped with each other to allow the seal ring to radially expand and contract. The one-end joint forming portion includes a one-end first contact portion and a one-end second contact portion located on one side of the one-end first contact portion in an axial direction of the seal ring and extending in a circumferential direction of the seal ring beyond the one-end first contact portion. The other-end joint forming portion includes an other-end first contact portion and an other-end second contact portion located on the other side of the other-end first contact portion in the axial direction and extending in the circumferential direction beyond the other-end first contact portion. The other-end first contact portion is configured to be in contact with the one-end second contact portion in a radial direction of the seal ring when the seal ring contracts. The other-end second contact portion is configured to be in contact with the one-end first contact portion in the radial direction and to be in contact with the one-end second contact portion in the axial direction when the seal ring contracts. The one-end first contact portion is configured to separate from the other-end second contact portion when the seal ring expands. An inner diameter of the tension ring at a timing the one-end first contact portion separates from the other-end second contact portion is less than an outer diameter of the outer circumferential end portion of the valve element.

DESCRIPTION OF EMBODIMENTS

Figure 1:
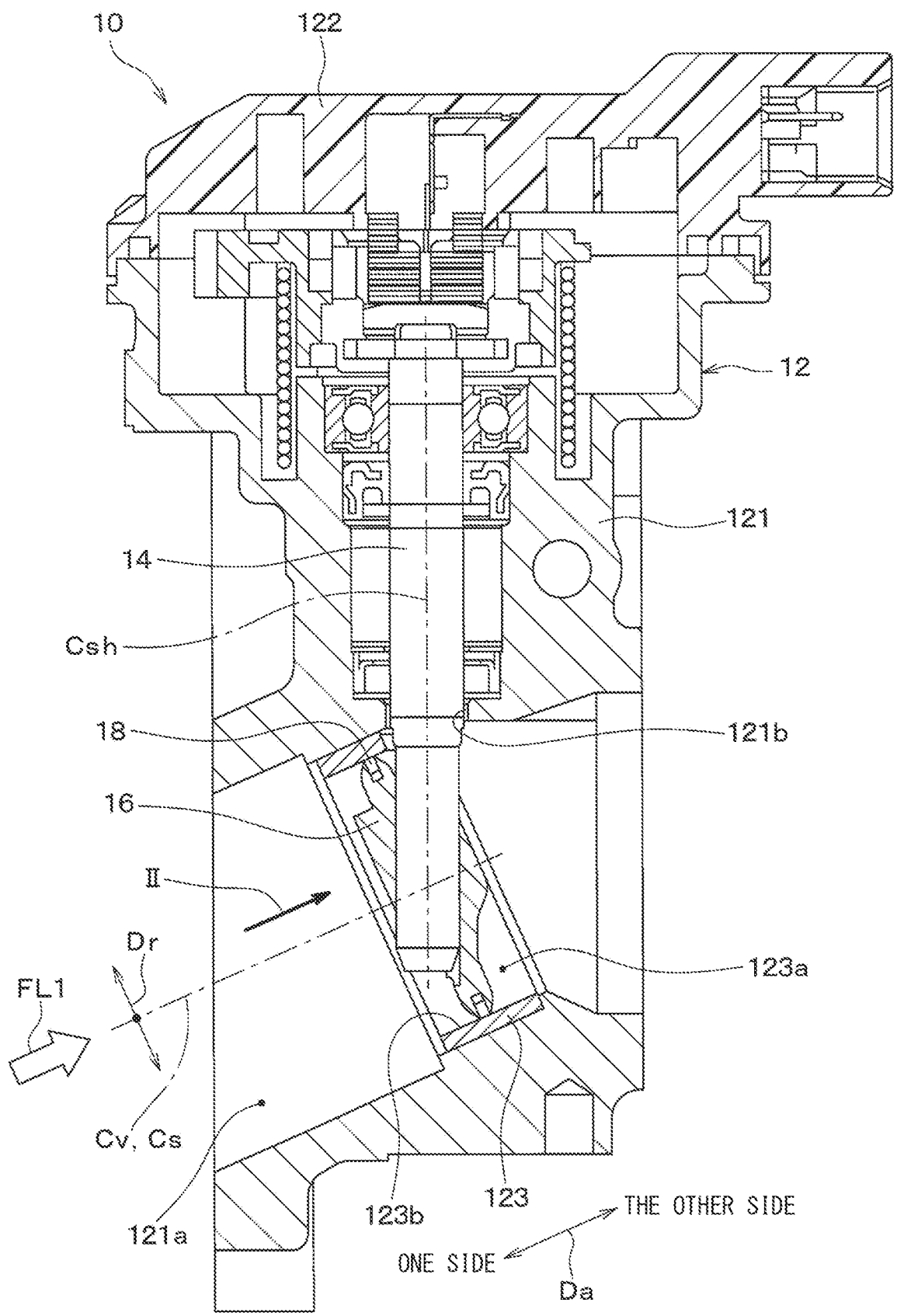
FIG. 1 is a diagram illustrating a schematic configuration of a valve device of a first embodiment, which is a cross-sectional view of the valve device taken along a plane on which a center axial line of a valve element and a center axial line of a rotational shaft extend.

To begin with, examples of relevant techniques will be described.

A valve device is configured as a butterfly valve. This valve device includes a housing defining a gas passage through which a gas flows, a valve element configured to open and close the gas passage by rotating in the gas passage, and an annular seal ring configured to seal a gap between an outer circumferential end of the valve element and an inner circumferential surface of the gas passage.

The seal ring is fit into a circumferential groove defined on the outer circumferential end of the valve element. Further, the seal ring has a joint that allows the diameter of the seal ring to increase and decrease.

In the valve device described above, during a valve opening period for which the gas passage is opened by the valve element, the pressure of the fluid (specifically, gas) in the gas passage sometimes acts on the seal ring to increase the diameter of the seal ring. In that case, the seal ring may be elastically deformed to increase the diameter of the seal ring and the seal ring may fall off from the circumferential groove of the valve element. When the seal ring falls off from the circumferential groove of the valve element in this way, for example, the seal ring may be caught between the valve element and the inner circumferential surface of the gas passage and hinders a rotation of the valve element.

On the other hand, the measures for reducing the possibility that the seal ring falls off from the circumferential groove of the valve element as described above have not been proposed.

It is also assumed that a tension ring that urges the seal ring to increase its diameter is disposed in the seal ring. In such a case, it is necessary to prevent the tension ring from falling off. The above points have been found as a result of detailed studies by the inventors.

In view of the above points, it is objective of the present disclosure to provide a valve device that suppresses a pressure of a fluid acting on the seal ring to increase its diameter and reduces a possibility that the seal ring or the tension ring falls off from an outer circumferential groove of the valve element.

According to an aspect of the present disclosure, a valve device includes a passage forming portion, a valve element, and an annular seal ring. The passage forming portion defines therein a fluid passage through which a fluid flows and includes a passage inner wall surface facing the fluid passage. The valve element is housed in the fluid passage and configured to open and close the fluid passage by rotating. The valve element has an outer circumferential end portion defining an outer circumferential groove. The annular seal ring is fit into the outer circumferential groove to seal a gap between the passage inner wall surface and the outer circumferential end portion of the valve element when the valve element fully closes the fluid passage. The seal ring includes, as a joint, a one-end joint forming portion and an other-end joint forming portion. The one-end joint forming portion and the other-end joint forming portion are slidably overlapped with each other to allow the seal ring to radially expand and contract. The one-end joint forming portion includes a one-end first contact portion and a one-end second contact portion located on one side of the one-end first contact portion in an axial direction of the seal ring and extending in a circumferential direction of the seal ring beyond the one-end first contact portion. The other-end joint forming portion includes an other-end first contact portion and an other-end second contact portion located on the other side of the other-end first contact portion in the axial direction and extending in the circumferential direction beyond the other-end first contact portion. The other-end first contact portion is configured to be in contact with the one-end second contact portion in a radial direction of the seal ring when the seal ring contracts. The other-end second contact portion is configured to be in contact with the one-end first contact portion in the radial direction and to be in contact with the one-end second contact portion in the axial direction when the seal ring contracts. The one-end first contact portion is configured to separate from the other-end second contact portion in the circumferential direction when the seal ring expands. An inner diameter of the seal ring at a timing the one-end first contact portion separates from the other-end second contact portion is less than an outer diameter of the outer circumferential end portion of the valve element.

According to this, even when the seal ring expands due to the pressure of the fluid in the fluid passage, the pressure of the fluid is released through a gap between the one-end first contact portion and the other-end second contact portion before the inner diameter of the seal ring reaches the outer diameter of the outer circumferential end portion. Therefore, the pressure of the fluid acting on the seal ring to expand the seal ring is suppressed, which reduces the possibility that the seal ring falls off from the outer circumferential groove of the valve element.

Also, according to another aspect of the present disclosure, a valve device includes a passage forming portion, a valve element, an annular seal ring, and a tension ring. The passage forming portion defines therein a fluid passage through which a fluid flows and includes a passage inner wall surface facing the fluid passage. The valve element is housed in the fluid passage and configured to open and close the fluid passage by rotating. The valve element has an outer circumferential end portion defining an outer circumferential groove. The annular seal ring is fit into the outer circumferential groove to seal a gap between the passage inner wall surface and the outer circumferential end portion of the valve element when the valve element fully closes the fluid passage. The tension ring has an arc shape extending in a circumferential direction of the seal ring and biasing the seal ring in a direction to radially expand the seal ring. The seal ring defines a side groove recessed in an axial direction of the seal ring and extending in the circumferential direction. The tension ring is fit into the side groove. The seal ring includes, as a joint, a one-end joint forming portion and an other-end joint forming portion. The one-end joint forming portion and the other-end joint forming portion are slidably overlapped with each other to allow the seal ring to radially expand and contract. The one-end joint forming portion includes a one-end first contact portion and a one-end second contact portion located on one side of the one-end first contact portion in an axial direction of the seal ring and extending in a circumferential direction of the seal ring beyond the one-end first contact portion. The other-end joint forming portion includes an other-end first contact portion and an other-end second contact portion located on the other side of the other-end first contact portion in the axial direction and extending in the circumferential direction beyond the other-end first contact portion. The other-end first contact portion is configured to be in contact with the one-end second contact portion in a radial direction of the seal ring when the seal ring contracts. The other-end second contact portion is configured to be in contact with the one-end first contact portion in the radial direction and to be in contact with the one-end second contact portion in the axial direction when the seal ring contracts. The one-end first contact portion is configured to separate from the other-end second contact portion when the seal ring expands. An inner diameter of the tension ring at a timing the one-end first contact portion separates from the other-end second contact portion is less than an outer diameter of the outer circumferential end portion of the valve element.

According to this, even when the tension ring and the seal ring expand due to the pressure of the fluid in the fluid passage, the pressure of the fluid is released through a gap between the one-end first contact portion and the other-end second contact portion before the inner diameter of the tension ring reaches the outer diameter of the outer circumferential end portion. Therefore, the pressure of the fluid acting on the seal ring to expand the seal ring is suppressed, which reduces the possibility that the tension ring falls off from the side groove of the seal ring and the outer circumferential groove of the valve element.

Hereinafter, embodiments are described with reference to the drawings. In the following embodiments, identical or equivalent elements are denoted by the same reference numerals as each other in the figures.

First Embodiment

A valve device 10 of the present embodiment shown in FIG. 1 is mounted in a vehicle having an engine and constitutes a part of an EGR system that returns a part of exhaust gas of the engine to an intake passage of the engine. The valve device 10 is configured to open and close an EGR passage through which EGR gas that is a part of the exhaust gas flows, and adjusts an opening degree of the EGR passage in the EGR system. Therefore, the valve device 10 of the present embodiment is a fluid control valve that increases or decreases the flow rate of a fluid that is a gas (specifically, EGR gas).

Figure 2:
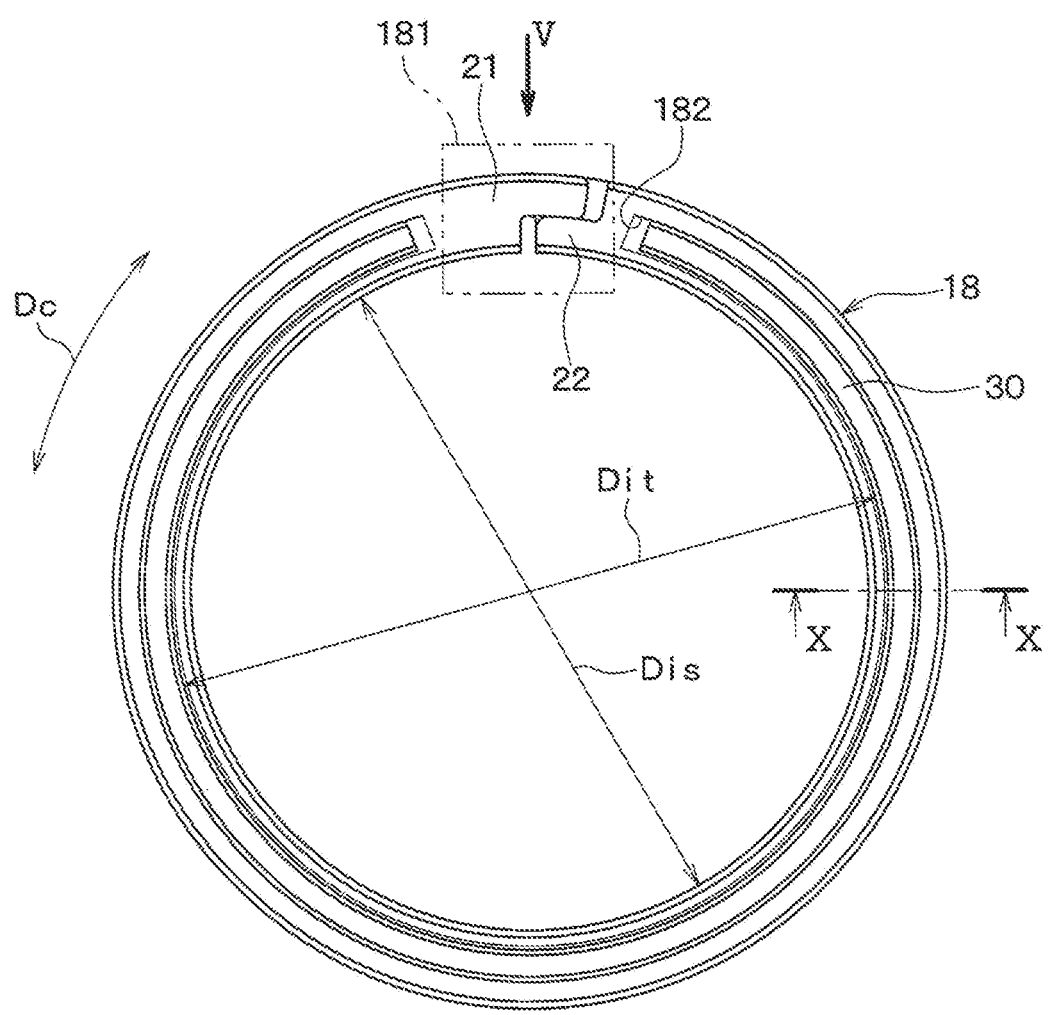
FIG. 2 is a view of a seal ring of the valve device and a tension ring disposed in the seal ring in the first embodiment viewed in a direction of an arrow II in FIG. 1.

As shown in FIGS. 1 and 2, the valve device 10 is a butterfly type fluid control valve. The valve device 10 includes a housing 12, a rotational shaft 14, a valve element 16, a seal ring 18, and a tension ring 30.

The housing 12 forms an outer contour of the valve device 10. The housing 12 houses the rotational shaft 14, an electric motor for rotating the rotational shaft 14, the valve element 16, the seal ring 18, the tension ring 30, and the like therein.

Further, the housing 12 is formed of a plurality of components. Specifically, the housing 12 includes a housing main body 121, a housing cover 122, a passage member 123, and the like.

The housing main body 121 is made of a metal such as an aluminum alloy. The housing main body 121 defines therein a housing passage 121a through which EGR gas flows. The EGR gas flowing through the valve device 10 when the valve element 16 is opened flows through the housing passage 121a from one end side to the other end side of the housing passage 121a as shown in an arrow FL1. The housing passage 121a forms a part of the EGR passage through which the EGR gas flows in the EGR system.

The passage member 123 as a passage forming portion is fit into a part of the housing passage 121a, and the passage member 123 is fixed to the housing main body 121 while being fit into the housing passage 121a. The passage member 123 has a cylindrical shape and defines therein a fluid passage 123a through which EGR gas flows. The fluid passage 123a forms a part of the housing passage 121a.

The housing cover 122 covers a part of the housing main body 121, and houses the electric motor or the like for rotating the rotational shaft 14 in a space defined between the housing cover 122 and the housing main body 121. The housing cover 122 is made of, for example, a resin. The housing cover 122 is fixed to the housing main body 121, for example, by screwing or the like.

Since the fluid passage 123a is defined inside the passage member 123, the passage member 123 surrounds the fluid passage 123a entirely in a circumference direction and has a passage inner wall surface 123b facing the fluid passage 123a. The fluid passage 123a has, for example, a passage cross-sectional having a circular shape.

The rotational shaft 14 has a predetermined rotational axial line Csh (in other words, a center axial line Csh). The rotational shaft 14 extends in an axial direction of the predetermined rotational axial line Csh. For example, the rotational shaft 14 is made of metal. The rotational shaft 14 has a substantially columnar shape although its diameter varies depending on its axial position. In the description of the present embodiment, the axial direction of the rotational shaft 14 (in other words, the axial direction of the rotational axis Csh) is also referred to as a rotational axis direction.

The housing main body 121 defines a shaft insertion hole 121b fluidly connected to the housing passage 121a and the rotational shaft 14 is rotatably inserted into the shaft insertion hole 121b. The rotational shaft 14 extends into the fluid passage 123a from the shaft insertion hole 121b such that one end of the rotational shaft 14 is located in the fluid passage 123a.

Further, the other end of the rotational shaft 14 is connected to the electric motor through a reduction mechanism housed in the housing main body 121 so as to transmit power from the electric motor to the rotational shaft 14. The rotational shaft 14 is rotatably supported by the housing main body 121 with a bearing provided in the housing main body 121.

The valve element 16 is housed in the fluid passage 123a, and configured to open and close the fluid passage 123a by rotating. The valve element 16 is made of metal, for example, and is fixed to the rotational shaft 14 by welding or the like. Therefore, the rotational force of the electric motor is transmitted to the valve element 16 via the rotational shaft 14. Then, the valve element 16 rotates about the rotational axis Csh together with the rotational shaft 14, thereby opening or closing the fluid passage 123*a*.

Specifically, the valve element 16 has, for example, a disk shape. The valve element 16 extends in the radial direction of the fluid passage 123*a* in a fully closed state where the valve element 16 fully closes the fluid passage 123*a*. Therefore, in the fully closed state of the valve element 16 (in other words, the fully closed posture of the valve element 16), the radial direction of the valve element 16 coincides with the radial direction of the fluid passage 123*a*, and the axial direction of the valve element 16 coincides with the axial direction of the fluid passage 123*a*. FIG. 1 shows the valve element 16 in the fully closed state.

Further, the central axis line Cv of the valve element 16 is arranged to intersect the rotational axis line Csh of the rotational shaft 14, but more specifically, the central axis line Cv of the valve element 16 is tilted relative to the rotational axis line Csh of the rotational shaft 14. In short, the valve element 16 is fixed to the rotational shaft 14 in a tilted posture with respect to the rotational shaft 14.

Figure 3:
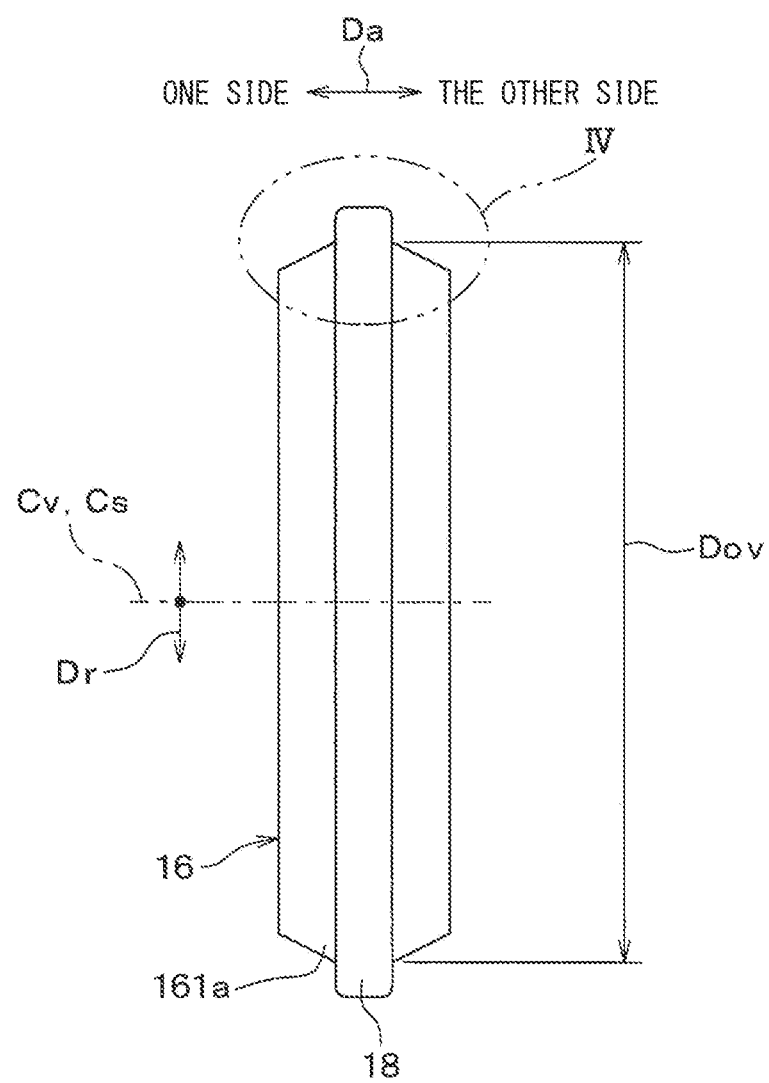
FIG. 3 is a view of the valve element of the valve device and the seal ring attached to the valve element in the first embodiment viewed in a ring radial direction.
Figure 4:
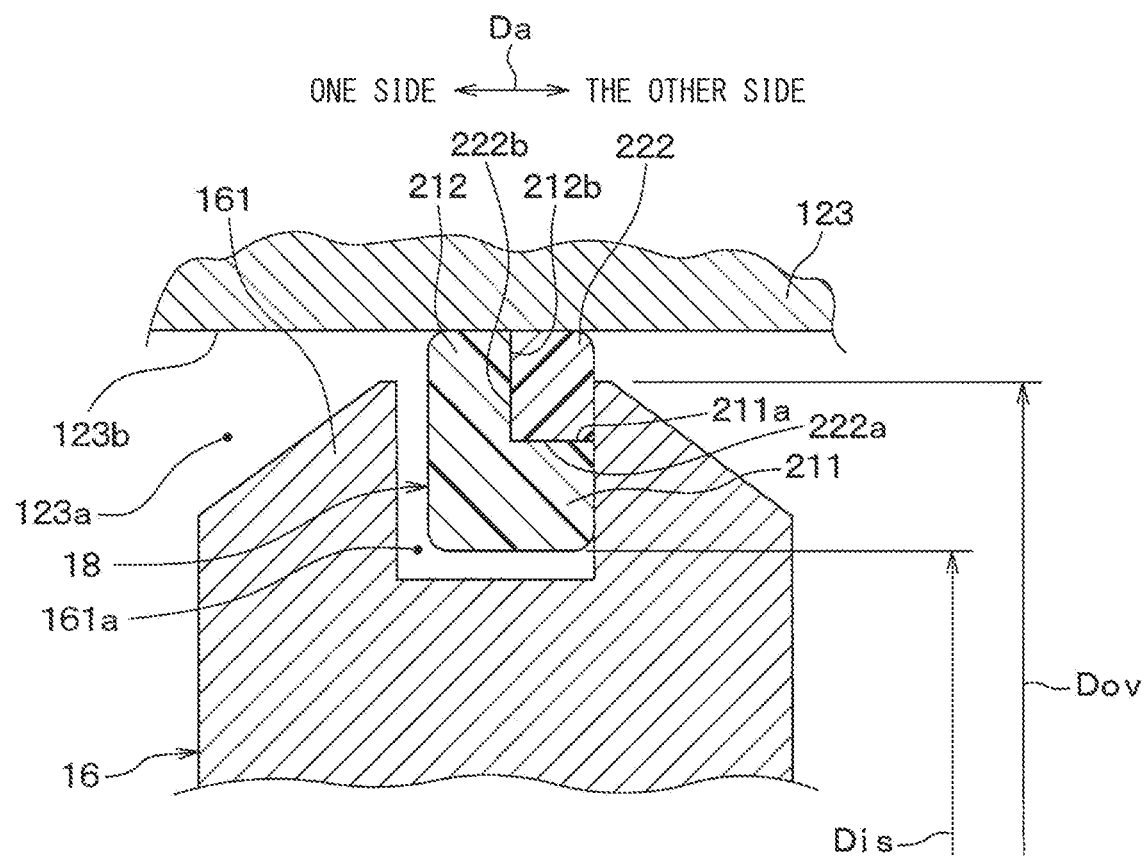
FIG. 4 is an enlarged cross-sectional view of a portion IV in FIG. 3 and a passage member of a housing when the valve element is in a fully closed state, which is viewed in the same direction as FIG. 3.

Further, as shown in FIGS. 1, 3, and 4, the valve element 16 has an outer circumferential end portion 161 on the radially outer side surface of the valve element 16. The outer circumferential end portion 161 defines an outer circumferential groove 161*a* that is recessed from the radially outer side surface of the valve element 16 into the radially inner side. The outer circumferential groove 161*a* extends entirely in the circumferential direction of the valve element 16. That is, the outer circumferential groove 161*a* is an annular groove extending in a ring shape.

The seal ring 18 is made of, for example, an elastically deformable resin. As shown in FIGS. 1, 2, and 4, the seal ring 18 seals a gap between the passage inner wall surface 123*b* and the outer circumferential end portion 161 of the valve element 16 during the fully closed state where the valve element 16 is fully closed. The seal ring 18 is fit into the outer circumferential groove 161*a* of the valve element 16 and has a ring shape that is coaxial with the valve element 16. The seal ring 18 is fit into the outer circumferential groove 161*a* of the valve element 16, so that the seal ring 18 is held by the valve element 16.

The seal ring 18 is fit into the outer circumferential groove 161*a* with a slight gap. Therefore, the central axis line Cs of the seal ring 18 may be slightly offset from the central axis line Cv of the valve element 16, but basically the central axis line Cs of the seal ring 18 coincides with the central axis line Cv of the valve element 16.

Further, in the description of the present embodiment, the axial direction Da of the seal ring 18 is also referred to as a ring axial direction Da, the radial direction Dr of the seal ring 18 is also referred to as a ring radial direction Dr, and the circumferential direction Dc of the seal ring 18 is referred to as a ring circumferential direction Dc.

The seal ring 18 has a closed annular shape when the seal ring 18 is fit into the outer circumferential groove 161*a* of the valve element 16. The seal ring 18 includes a one-end joint forming portion 21 and an other-end joint forming portion 22 so that the diameter of the seal ring 18 can increase and decrease.

The seal ring 18 includes one end and another end in the ring circumferential direction Dc. The one-end joint forming portion 21 is formed on the one end of the seal ring 18 in the ring circumferential direction Dc and the other-end joint forming portion 22 is formed on the other end of the seal ring 18 in the ring circumferential direction Dc. The one-end joint forming portion 21 and the other-end joint forming portion 22 form a joint 181 that allows the seal ring 18 to radially expand and contract by slidably overlapping with each other. The joint 181 of the seal ling 18 is a so-called step-cut joint. Since the seal ring 18 has an annular shape, the diameter of the seal ring 18 is a general term for the inner diameter Dis and the outer diameter of the seal ring 18.

Figure 5:
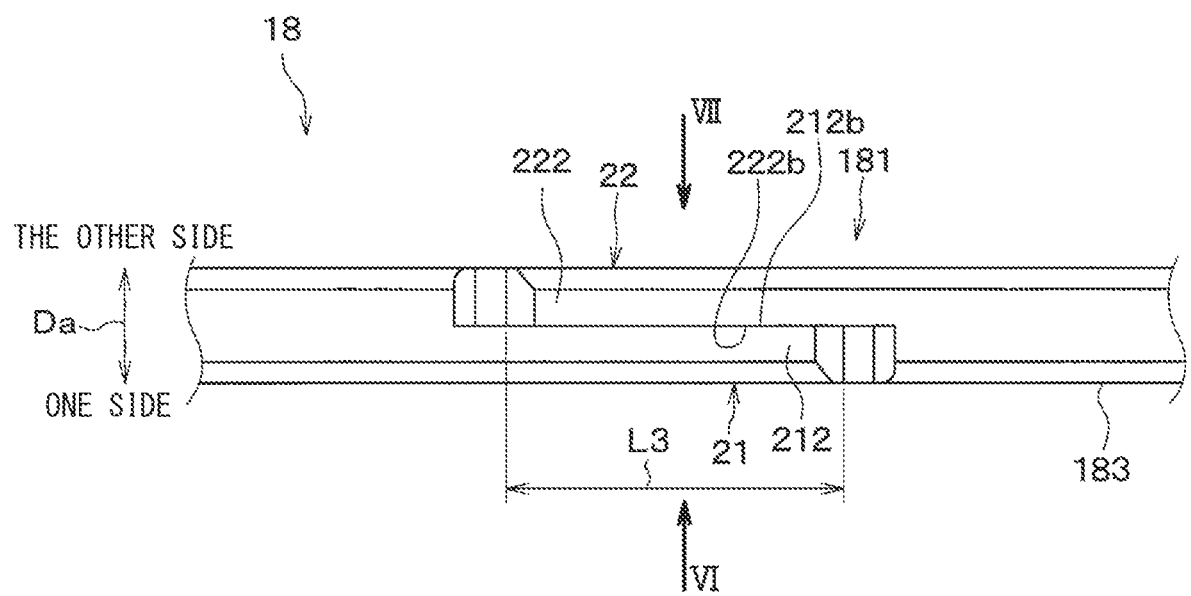
FIG. 5 is an enlarged view of a joint of the seal ring viewed in a direction of an arrow V in FIG. 2.
Figure 6:
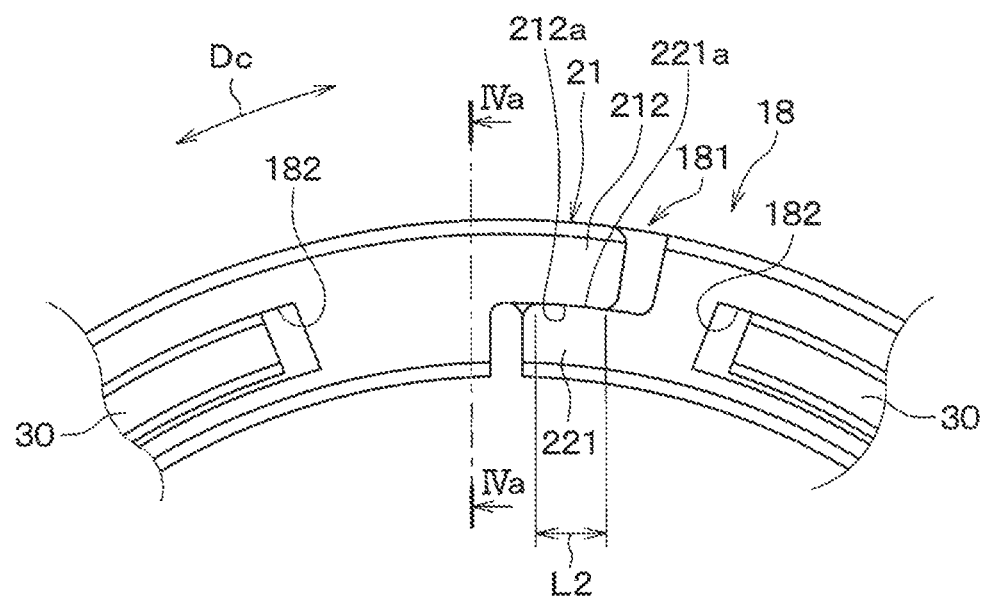
FIG. 6 is a view viewed in a direction of an arrow VI in FIG. 5.
Figure 7:
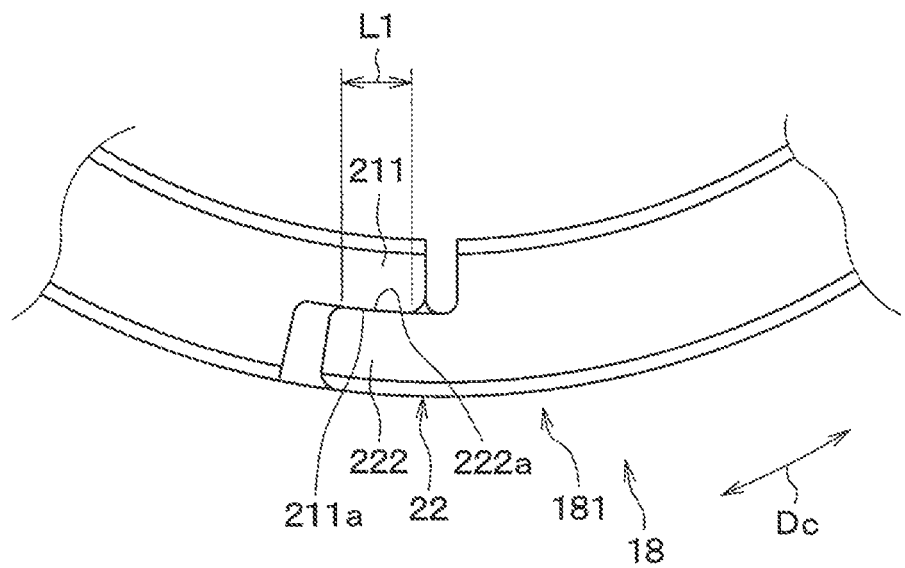
FIG. 7 is a view viewed in a direction of an arrow VII in FIG. 5.

Specifically, as shown in FIGS. 5 to 7, the one-end joint forming portion 21 includes a one-end first contact portion 211 and a one-end second contact portion 212. The one-end second contact portion 212 is located on one side of the one-end first contact portion 211 in the ring axial direction Da and extends in the ring circumferential direction Dc beyond the one-end first contact portion 211.

Further, the other-end joint forming portion 22 is symmetrically formed with the one-end joint forming portion 21 such that the other-end joint forming portion 22 has the same shape with the one-end joint forming portion 21 when rotated by 180° about an axial line extending in the ring radial direction. Thus, the other-end joint forming portion 22 includes an other-end first contact portion 221 and an other-end second contact portion 222. The other-end second contact portion 222 is located on the other side of the other-end first contact portion 221 in the ring axial direction Da and extends in the circumferential direction Dc beyond the other-end first contact portion 221.

As shown in FIGS. 1 and 3, when the valve element 16 is fully closed, the one side in the ring axial direction Da is located in an upstream portion of the fluid passage 123*a* in a flow direction of the fluid, and the other side in the ring axial direction Da is located in a downstream portion of the fluid passage 123*a* in a flow direction of the fluid.

Figure 8:
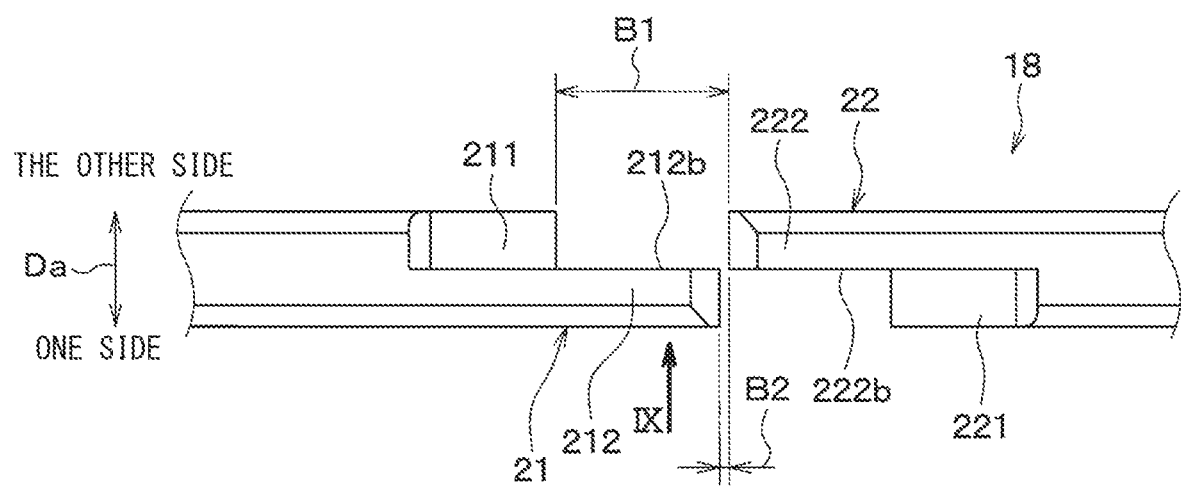
FIG. 8 is a view of a one-end joint forming portion and an other-end joint forming portion that form a joint of the seal ring viewed in the same direction as FIG. 5, which illustrates a state where the one-end joint forming portion is distanced away from the other-end joint forming portion in a ring circumferential direction.
Figure 9:
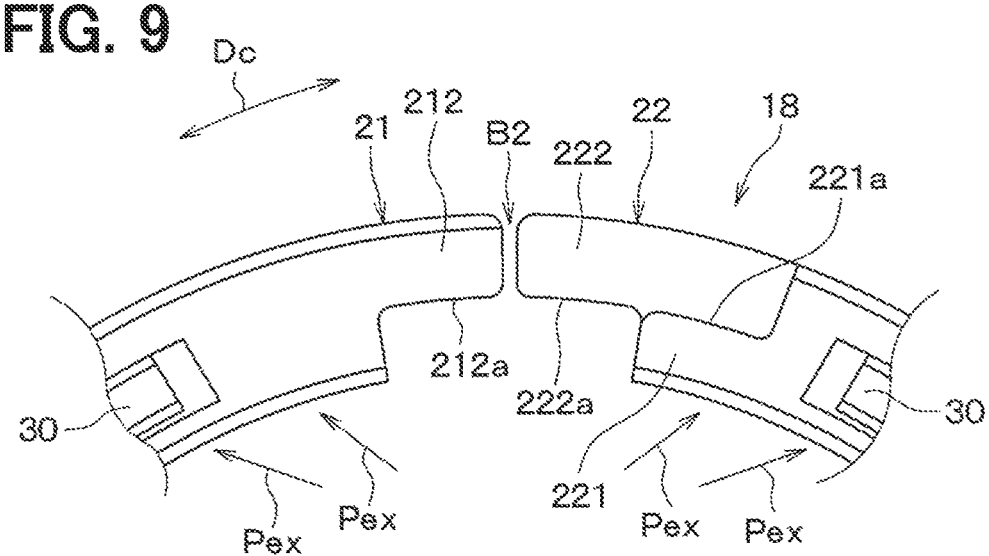
FIG. 9 is a view viewed in a direction of an arrow IX in FIG. 8.

As shown in FIGS. 8 and 9, in the one-end joint forming portion 21, the one-end second contact portion 212 is located outside of the one-end first contact portion 211 in the ring radial direction Dr. In the other-end joint forming portion 22, the other-end second contact portion 222 is located outside of the other-end first contact portion 221 in the ring radial direction Dr.

Further, a portion of the one-end joint forming portion 21 located outside of the one-end first contact portion 211 in the ring radial direction Dr and located on the other side of the one-end second contact portion 212 in the ring axial direction Da is hollow. This is not to prevent the other-end second contact portion 222 from moving in the ring circumferential direction Dc relative to the one-end joint forming portion 21.

Similarly, a portion of the other-end joint forming portion 22 located outside of the other-end first contact portion 221 in the ring radial direction Dr and located on the one side of the other-end second contact portion 222 in the ring axial direction Da is hollow. This is not to prevent the one-end second contact portion 212 from moving in the ring circumferential direction Dc relative to the other-end joint forming portion 22.

As shown in FIG. 1, in the valve device 10, since the valve element 16 and the seal ring 18 are housed in the passage member 123 of the housing 12, the passage member 123 prevents the diameter of the seal ring 18 from increasing. FIGS. 8 and 9 show a movement of the seal ring 18 if there is no restriction to prevent the seal ring 18 from deforming to increase its diameter.

In the joint 181 of the seal ring 18 configured as described above, as shown in FIGS. 5 to 7, the other-end first contact portion 221 is configured to be in contact with the one-end second contact portion 212 in the ring radial direction Dr when the seal ring 18 contracts. The other-end second contact portion 222 is configured to be in contact with the one-end first contact portion 211 in the ring radial direction Dr and to be in contact with the one-end second contact portion 212 in the ring axial direction Da when the seal ring 18 contracts.

Specifically, the one-end first contact portion 211 is located inside of the other-end second contact portion 222 in the ring radial direction Dr, and the other-end first contact portion 221 is located inside of the one-end second contact portion 212 in the ring radial direction Dr. Further, the one-end second contact portion 212 is located on the one side of the other-end second contact portion 222 in the ring axial direction Da.

The one-end first contact portion 211 includes a contact surface 211a facing outward in the ring radial direction Dr and the other-end first contact portion 221 includes a contact surface 221a facing outward in the ring radial direction Dr. The one-end second contact portion 212 has a radial contact surface 212a facing inward in the ring radial direction Dr and an axial contact surface 212b facing toward the other side in the ring axial direction Da. The other-end second contact portion 222 has a radial contact surface 222a facing inward in the ring radial direction Dr and an axial contact surface 222b facing toward the one side in the ring axial direction Da.

In the joint 181, the contact surface 211a of the one-end first contact portion 211 is slidably in contact with the radial contact surface 222a of the other-end second contact portion 222, and the contact surface 221a of the other-end first contact portion 221 is slidably in contact with the radial contact surface 212a of the one-end second contact portion 212. At the same time, the axial contact surface 212b of the one-end second contact portion 212 and the axial contact surface 222b of the other-end second contact portion 222 are slidably in contact with each other.

Further, as shown in FIG. 4, the contact surfaces 211a, 212a, 221a, and 222a facing the ring radial direction Dr are located inside the outer circumferential groove 161a of the valve element 16 when the valve element 16 is fully closed. That is, the contact surfaces 211a, 212a, 221a, and 222a are arranged radially inward of the outer diameter of the valve element 16.

As shown in FIGS. 6 and 7, each of the contact surfaces 211a, 212a, 221a and 222a that face in the ring radial direction Dr has both ends connected to corners R. However, the corners R are not included in the contact surfaces 211a, 212a, 221a and 222a. The corners R are not portions that slide on the opposite contact surfaces.

As shown in FIGS. 2 and 6, the tension ring 30 extends in an arc shape along the ring circumferential direction Dc about the central axis line Cs of the seal ring 18. The tension ring 30 is made of an elastic metal such as a spring material.

The tension ring 30 biases the seal ling 18 in a direction to expand the seal ring 18 due to the elasticity of the tension ring 30. Therefore, as shown in FIGS. 1 and 4, when the valve element 16 is fully closed, the seal ring 18 is pressed against the passage inner wall surface 123b and in close contact with the passage inner wall surface 123b. In addition, the pressure of EGR gas also presses the seal ring 18 against the passage inner wall surface 123b. FIG. 4 shows the seal ring 18 taken along a line IVa-IVa in FIG. 6.

Figure 10:
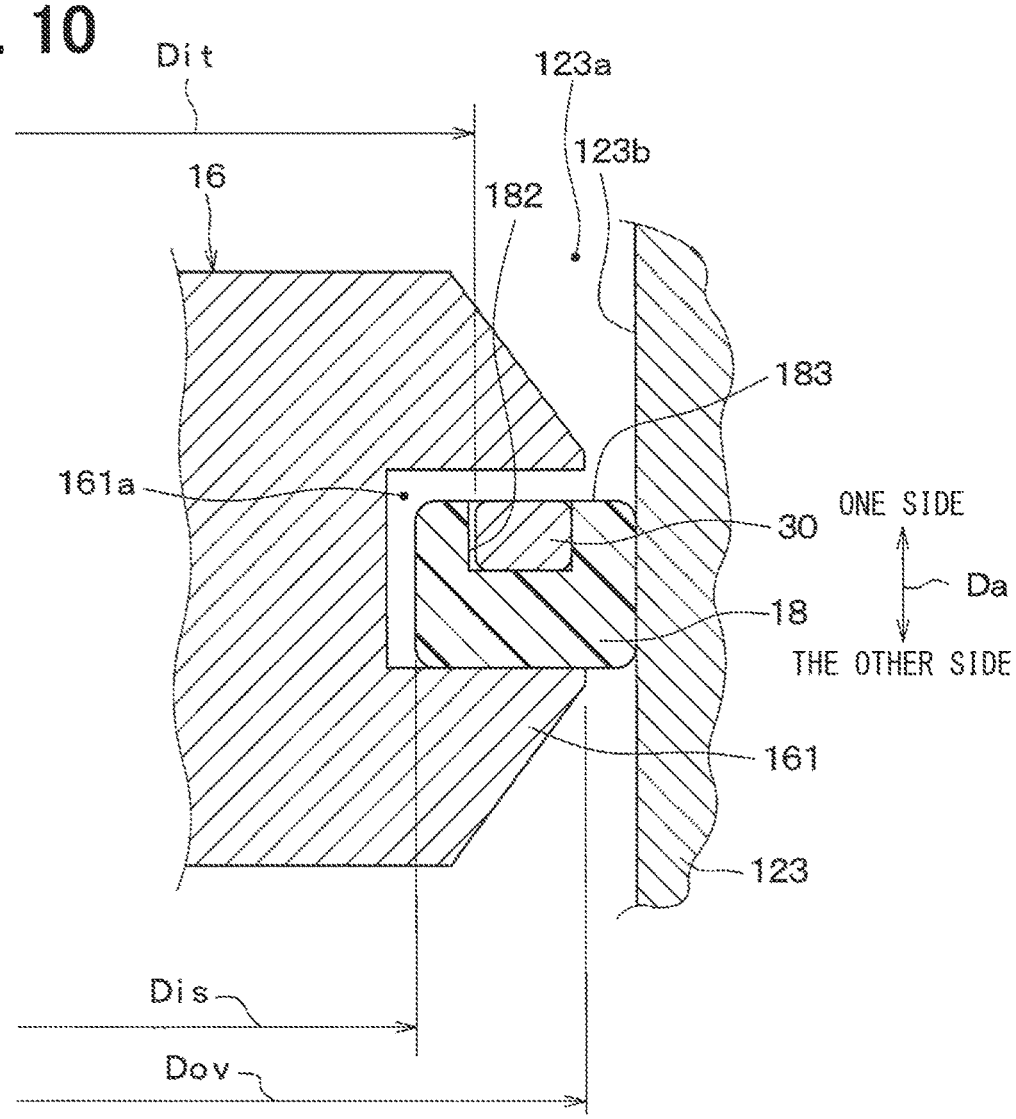
FIG. 10 is a cross-sectional view in the first embodiment taken along a line X-X in FIG. 2, which also illustrates a passage member of the housing when the valve element is in fully closed state.

Specifically, as shown in FIGS. 2, 6 and 10, the tension ring 30 is fit into the side groove 182 defined in the seal ring 18. The side groove 182 is defined on the side surface 183 of the seal ring 18 facing the one side in the ring axial direction Da. The side groove 182 is recessed from the side surface 183 toward the other side in the ring axial direction Da and extends in the ring circumferential direction Dc. For example, the side groove 182 is a groove having a rectangular cross-sectional shape. The tension ring 30 and the side groove 182 do not extend to a portion of the seal ring 18 occupied by the joint 181.

In the valve device 10 configured in this way, as shown in FIG. 1, the valve element 16 rotates about the rotational axis Csh together with the rotational shaft 14. Then, the opening degree of the fluid passage 123a is increased or decreased according to the rotation position of the valve element 16.

Further, as shown in FIGS. 2 and 4, the inner diameter Dis of the seal ring 18 and the inner diameter Dit of the tension ring 30 can be increased or decreased depending on the function of the joint 181. However, the inner diameter Dis and the inner diameter Dit are set as described below according to a relationship with the outer diameter Dov of the valve element 16 (more specifically, the outer diameter Dov of the outer circumferential end portion 161).

That is, the inner diameter Dis of the seal ring 18 at a timing the one-end first contact portion 211 separates from the other-end second contact portion 222 is less than the outer diameter Dov of the valve element 16. In other words, when the inner diameter Dis of the seal ring 18 at a timing the contact state where the one-end first contact portion 211 and the other-end second contact portion 222 are in contact with each other is switched into the contactless state where the one-end first contact portion 211 and the other-end second contact portion 222 are not in contact with each other along with the increase in the diameter of the seal ring 18 is defined as a first seal inner diameter D1is, the following inequality F1 is satisfied.

$$D1is < Dov \tag{F1}$$

Further, the inner diameter Dit (See FIG. 10) of the tension ring 30 at a timing the one-end first contact portion 211 separates from the other-end second contact portion 222 is less than the outer diameter Dov of the valve element 16. In other words, when the inner diameter Dit of the tension ring 30 at a timing the contact state where the one-end first contact portion 211 and the other-end second contact portion 222 are in contact with each other is switched into the contactless state due to the increase in the diameter of the seal ring 18 is defined as a first tension ring inner diameter D1it, the following inequality F2 is satisfied.

$$D1it < Dov \tag{F2}$$

Here, the above-mentioned "a timing the one-end first contact portion 211 and the other-end second contact portion 222 are switched from the contact state into the contactless state along with the increase in the diameter of the seal ring 18" is, in other words, a timing a first overlap allowance L1 shown in FIG. 7 becomes zero from a value greater than zero. The first overlap allowance L1 is a length in the circumferential direction Dc of an overlapping portion between the contact surface 211a of the one-end first contact portion 211 and the radial contact surface 222a of the other-end second contact portion 222. The outer diameter Dov of the valve element 16 is also referred to as the valve element outer diameter Dov.

Further, at a timing the one-end first contact portion 211 and the other-end second contact portion 222 are switched from the contact state into the contactless state as the diameter of the seal ring 18 increases, the other-end first contact portion 221 and the one-end second contact portion 212 are also simultaneously or substantially simultaneously switched from a contact state into a contactless state. Therefore, when the inner diameter Dis of the seal ring 18 at a timing the other-end first contact portion 221 and the one-end second contact portion 212 are switched into the contactless state from the contact state due to the increase in the diameter of the seal ring 18 is defined as a second seal inner diameter D2*is*, the following inequality F3 is satisfied.

$$D2is < Dov \quad (F3)$$

Then, the inner diameter Dit of the tension ring 30 at a timing the other-end first contact portion 221 and the other-end second contact portion 212 are switched into the contactless state from the contact state along with the increase in the diameter of the tension ring 30 is defined as a second tension ring inner diameter D2*it*, the following inequality F4 is satisfied.

$$D2it < Dov \quad (F4)$$

Here, the above-mentioned "a timing the other-end first contact portion 221 and the one-end second contact portion 212 are switched from the contact state into the contactless state along with the increase in the diameter of the seal ring 18" is, in other words, a timing a second overlap allowance L2 shown in FIG. 6 becomes zero from a value greater than zero. The second overlap allowance L2 is a length in the circumferential direction Dc of an overlapping portion between the contact surface 221*a* of the other-end first contact portion 221 and the radial contact surface 212*a* of the one-end second contact portion 212.

Further, the inner diameter Dis of the seal ring 18 at a timing the one-end second contact portion 212 separates from the other-end second contact portion 222 is less than the outer diameter Dov of the valve element 16. In other words, when the inner diameter Dis of the seal ring 18 at a timing the contact state where the one-end second contact portion 212 and the other-end second contact portion 222 are in contact with each other is switched into the contactless state is defined as a third seal inner diameter D3*is*, the following inequality F5 is satisfied.

$$D3is < Dov \quad (F5)$$

Further, the inner diameter Dit (see FIG. 10) of the tension ring 30 at a timing the one-end second contact portion 212 separates from the other-end second contact portion 222 is less than the valve element outer diameter Dov. In other words, when the inner diameter Dit of the tension ring 18 at a timing the one-end second contact portion 212 and the other-end second contact portion 222 are switched into the contactless state from the contact state along with the increase in the diameter of the seal ring 18 is defined as a third tension ring inner diameter D3*it*, the following inequality F6 is satisfied.

$$D3it < Dov \quad (F6)$$

Here, the above-mentioned "a timing the one-end second contact portion 212 and the other-end second contact portion 222 are switched from the contact state into the contactless state along with the increase in the diameter of the seal ring 18" is, in other words, when a third overlap allowance L3 shown in FIG. 5 becomes zero from a value greater than zero. The third overlap allowance L3 is a length in the circumferential direction Dc of an overlapping portion between the axial contact surface 212*b* of the one-end second contact portion 212 and the axial contact surface 222*b* of the other-end second contact portion 222.

As a confirmation, the dimensional relationship between the valve element outer diameter Dov and the inner diameters Dis and Dit described above is satisfied when the inner diameters Dis and Dit are not limited by the passage inner wall surface 123*b* (see FIG. 10) and the diameter of the seal ring 18 can be increased.

The valve device 10 of the present embodiment has the following advantages. As described above, according to the present embodiment, the inner diameter Dis (See FIG. 10) of the seal ting 18 at a timing the one-end first contact portion 211 separates from the other-end second contact portion 222 along with the increase in the diameter of the seal ring 18 is less than the valve element outer diameter Dov. Therefore, even when the diameter of the seal ring 18 is increased by the fluid pressure in the fluid passage 123*a* shown in FIG. 1, the fluid pressure is released from a gap B1 (see FIG. 8) between the one-end first contact portion 211 and the other-end second contact portion 222 before the inner diameter Dis of the seal ring 18 reaches the valve element outer diameter Dov.

Therefore, the fluid pressure acting on the seal ring 18 to increase the diameter of the seal ring 18 is suppressed, which reduces the possibility that the seal ring 18 falls off from the outer circumferential groove 161*a* of the valve element 16. Preventing the seal ring 18 from falling off by releasing the fluid pressure in this way is particularly effective because the joint 181 called a step-cut joint is adopted in the seal ring 18 of the present embodiment. In FIG. 9, the fluid pressure in the fluid passage 123*a* for increasing the diameter of the seal ring 18 is shown by arrows Pex.

Further, according to the present embodiment, the inner diameter Dis of the seal ring 18 at a timing the one-end second contact portion 212 separates from the other-end second contact portion 222 is less than the valve element outer diameter Dov. Therefore, when the diameter of the seal ring 18 is increased by the fluid pressure in the fluid passage 123*a* in FIG. 1, the fluid pressure is released through a gap B2 (see FIG. 8) between the one-end second contact portion 212 and the other-end second contact portion 222 before the inner diameter Dis of the seal ring 18 reaches the valve element outer diameter Dov. Therefore, it is possible to further reduce the possibility that the seal ring 18 falls off from the outer circumferential groove 161*a* of the valve element 16.

Further, according to the present embodiment, the inner diameter Dit (see FIG. 10) of the tension ring 30 at a timing the one-end first contact portion 211 separates from the other-end second contact portion 222 is less than the valve element outer diameter Dov. Therefore, even when the diameter of the seal ring 18 and the diameter of the tension ring 30 are increased by the fluid pressure in the fluid passage 123*a* shown in FIG. 1, the fluid pressure is released through the gap B1 shown in FIG. 8 before the inner diameter Dit of the tension ring 30 reaches the valve element outer diameter Dov.

Therefore, the fluid pressure acting on the seal ring 18 to increase the diameter of the seal ring 18 is suppressed, thereby reducing the possibility that the tension ring 30 falls off from the side groove 182 of the seal ring 18 and from the outer circumferential groove 161*a* of the valve element 16.

Further, according to the present embodiment, the inner diameter Dit (see FIG. 10) of the tension ring 30 at a timing the one-end second contact portion 212 separates from the other-end second contact portion 222 along with the increase in the diameter of the seal ring 18 is less than the valve element outer diameter Dov. Therefore, when the diameter of the seal ring 18 is increased by the fluid pressure in the fluid passage 123*a* shown in FIG. 1, the fluid pressure is released through the gap B2 shown in FIG. 8 before the inner diameter Dit of the tension ring 30 reaches the valve element outer diameter Dov. Therefore, it is possible to further reduce the possibility that the tension ring 30 falls off from the side groove 182 of the seal ring 18 and from the outer circumferential groove 161a of the valve element 16.

Further, according to the present embodiment, the tension ring 30 is made of, for example, an elastic metal. In this case, the tension ring 30 can ensure the function of pressing the seal ring 18 against the passage inner wall surface 123b and bringing the seal ring 18 into close contact with the passage inner wall surface 123b when the valve element 16 is fully closed.

Further, according to the present embodiment, the seal ring 18 is made of, for example, a resin. In this case, there is an advantage that the joint 181 can be easily formed in the seal ring 18 in the step of molding of the seal ring 18.

Second Embodiment

A second embodiment of the present disclosure will be described next. The present embodiment will be explained mainly with respect to portions different from those of the first embodiment. In addition, explanations of the same or equivalent portions as those in the above embodiment will be omitted or simplified. The same applies to the description of the embodiments as described later.

Figure 11:
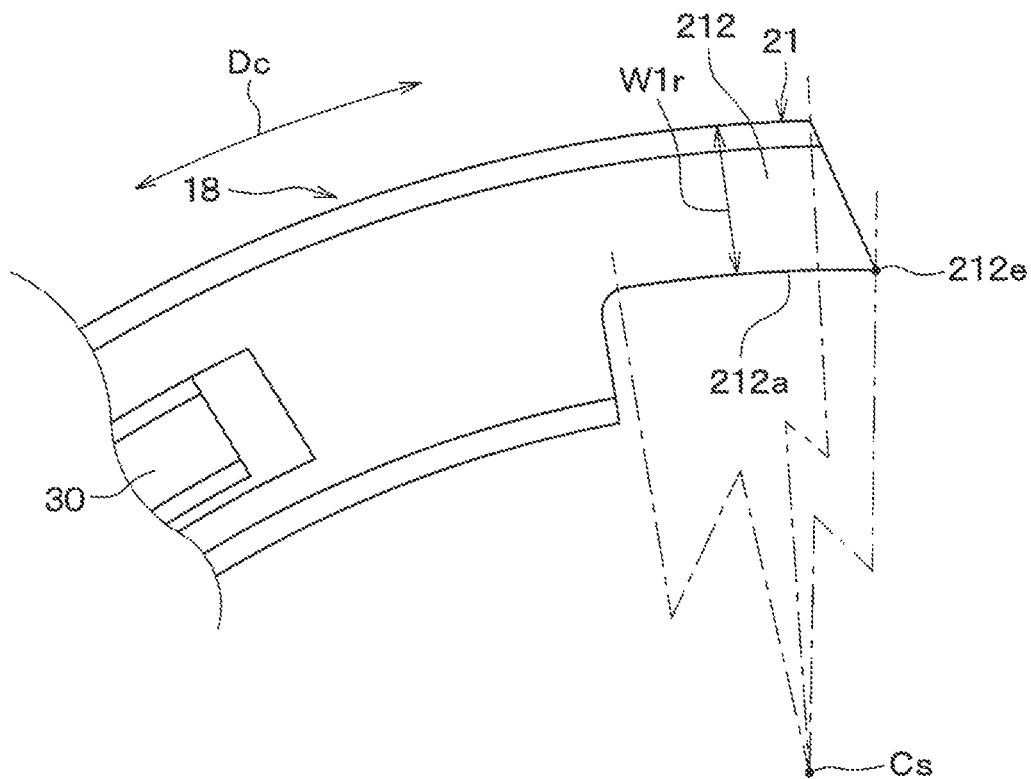
FIG. 11 is a diagram illustrating a one-end joint forming portion of the seal ring in a second embodiment, which viewed in the same direction as FIG. 9.
Figure 12:
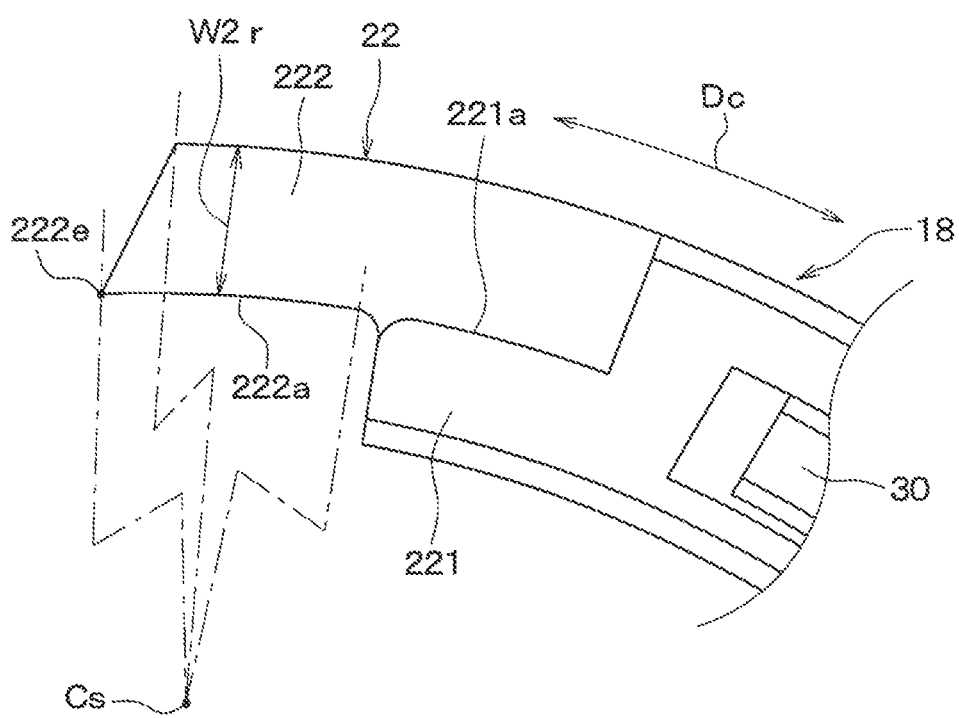
FIG. 12 is a diagram illustrating an other-end joint forming portion of the seal ring in the second embodiment, which viewed in the same direction as FIG. 11.

As shown in FIGS. 11 and 12, in the present embodiment, the shapes of the one-end second contact portion 212 and the other-end second contact portion 222 that form the joint 181 of the seal ring 18 are different from those in the first embodiment.

Specifically, the one-end second contact portion 212 has a circumferential top portion 212e located at a top portion in the ring circumferential direction Dc. The one-end second contact portion 212 has a radial width W1r in the ring radial direction Dr (see FIG. 3) and the circumferential top portion 212e is located to be offset toward an inner side in the ring radial direction Dr relative to a center of the radial width W1. For example, the circumferential top portion 212e is arranged to overlap with the radial contact surface 212a of the one-end second contact portion 212.

The shape of the tip portion of the other-end second contact portion 222 is similar to this. That is, the other-end second contact portion 222 has a circumferential top portion 222e located at a top portion in the ring circumferential direction Dc. The other-end second contact portion 222 has a radial width W2r in the ring radial direction Dr and the circumferential top portion 222e is located to be offset toward an inner side in the ring radial direction Dr relative to a center of the radial width W2r. For example, the circumferential top portion 222e is arranged to overlap with the radial contact surface 222a of the other end second contact portion 212.

Therefore, for example, as compared with the first embodiment described above, a communication passage to release the fluid pressure acting on the seal ring 18 to increase the diameter of the seal ring 18 can be defined between the one-end second contact portion 212 and the other-end second contact portion 222 with a reduced inner dimeter Dis of the seal ring 18. Specifically, the communication passage is a passage fluidly connecting the one side and the other side of the seal ring 18 in the ring axial direction Da. Therefore, when the diameter of the seal ring 18 is increased by the fluid pressure in the fluid passage 123a of FIG. 1, the fluid pressure to increase the diameter of the seal ring 18 can be further easily released.

In this embodiment, each of the one-end second contact portion 212 and the other-end second contact portion 222 corresponds to a predetermined contact portion.

Aside from the above described aspects, the present embodiment is the same as the first embodiment. Thus, in the present embodiment, the same effects as those of the first embodiment described above can be obtained in the same manner as in the first embodiment.

Other Embodiments (1) In each of the above-described embodiments, the fluid whose flow rate is increased or decreased by the valve device 10 is a gas, but the fluid is not limited to a gas and may be, for example, a liquid.

(2) In each of the above-described embodiments, the valve device 10 is an EGR valve used in the EGR system, but the application of the valve device 10 is not limited. For example, the valve device 10 may be used as a throttle valve of a vehicle.

(3) In each of the above-described embodiments, as shown in FIGS. 1 and 3, the valve device 10 is a butterfly type fluid control valve, but the valve device 10 may be a fluid control valve other than the butterfly type fluid control valve.

(4) In each of the above-described embodiments, as shown in FIG. 10, the side groove 182 into which the tension ring 30 is fit is defined on the side surface 183 of the seal ring 18 facing the one side in the ring axial direction Da. But this is just one example. For example, in contrast, the side groove 182 may be defined on the side surface of the seal ring 18 facing the other side in the ring axial direction Da.

(5) In each of the above-described embodiments, as shown in FIG. 10, the side groove 182 has a rectangular cross-sectional shape. However, the cross-sectional shape of the side groove 182 is not limited as long as the tension ring 18 can bias the seal ring 18 in a direction to increase the diameter of the seal ring 18.

(6) In each of the above embodiments, as shown in FIG. 2, the valve device 10 includes the tension ring 30 attached to the seal ring 18, but this is one example. For example, when the seal ring 18 is sufficiently pressed against the passage inner wall surface 123b by the elastic force of the seal ring 18 itself when the valve element 16 is fully closed, the tension ring 30 may not be provided.

(7) In the above-mentioned second embodiment, as shown in FIGS. 11 and 12, the one-end second contact portion 212 has the circumferential top portion 212e located offset toward an inner side in the ring radial direction Dr. The other-end second contact portion 222 is also includes the circumferential top portion 222e located offset toward an inner side in the ring radial direction Dr. However, this is an example. For example, one of the one-end second contact portion 212 and the other-end second contact portion 222 may have the shape described in the second embodiment and the other may have the shape described in the first embodiment as shown in FIG. 9.

(8) The present disclosure is not limited to the above-described embodiment, and can be implemented in various modifications. Further, in each of the above-mentioned embodiments, it goes without saying that components of the embodiment are not necessarily essential except for a case in which the components are particularly clearly specified as essential components, a case in which the components are clearly considered in principle as essential components, and the like.

Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

What is claimed is:

1. A valve device comprising:
a passage forming portion defining therein a fluid passage through which a fluid flows and including a passage inner wall surface facing the fluid passage;
a valve element housed in the fluid passage and configured to open and close the fluid passage by rotating, the valve element having an outer circumferential end portion defining an outer circumferential groove;
an annular seal ring fit into the outer circumferential groove to seal a gap between the passage inner wall surface and the outer circumferential end portion of the valve element when the valve element fully closes the fluid passage, wherein
the seal ring includes, as a joint, a one-end joint forming portion and an other-end joint forming portion, the one-end joint forming portion and the other-end joint forming portion being slidably overlapped with each other to allow the seal ring to radially expand and contract,
the one-end joint forming portion includes:
a one-end first contact portion; and
a one-end second contact portion located on one side of the one-end first contact portion in an axial direction of the seal ring and extending in a circumferential direction of the seal ring beyond the one-end first contact portion,
the other-end joint forming portion includes:
an other-end first contact portion configured to be in contact with the one-end second contact portion in a radial direction of the seal ring when the seal ring contracts; and
an other-end second contact portion located on the other side of the other-end first contact portion in the axial direction and extending in the circumferential direction beyond the other-end first contact portion, the other-end second contact portion being configured to be in contact with the one-end first contact portion in the radial direction and to be in contact with the one-end second contact portion in the axial direction when the seal ring contracts,
the one-end first contact portion is configured to separate from the other-end second contact portion when the seal ring expands, and
an inner diameter of the seal ring at a timing the one-end first contact portion separates from the other-end second contact portion is less than an outer diameter of the outer circumferential end portion of the valve element;
the valve device is configured such that
the gap between the passage inner wall surface and the outer circumferential end portion of the valve element is sealed when the one-end first contact portion and the other-end second contact portion of the seal ring are in contact with each other, and
a pressure of the fluid is released through a gap between the one-end first contact portion and the other-end second contact portion of the seal ring when the one-end first contact portion separates from the other-end second contact portion.

2. The valve device according to claim 1, wherein
the one-end second contact portion is configured to separate from the other-end second contact portion when the seal ring expands, and
the inner diameter of the seal ring at a timing the one-end second contact portion separates from the other-end second contact portion is less than the outer diameter of the outer circumferential end portion of the valve element.

3. The valve device according to claim 1, further comprising
a tension ring having an arc shape extending in the circumferential direction and biasing the seal ring in a direction to radially expand the seal ring, wherein
the seal ring defines a side groove recessed in the axial direction and extending in the circumferential direction,
the tension ring is fit into the side groove, and
an inner diameter of the tension ring at the timing the one-end first contact portion separates from the other-end second contact portion is less than the outer diameter of the outer circumferential end portion of the valve element.

4. The valve device according to claim 3, wherein
the one-end second contact portion is configured to separate from the other-end second contact portion when the seal ring expands, and
the inner diameter of the tension ring at a timing the one-end second contact portion separates from the other-end second contact portion is less than the outer diameter of the outer circumferential end portion of the valve element.

5. The valve device according to claim 3, wherein
the tension ring is made of a metal having an elasticity.

6. The valve device according to claim 1, wherein
the one-end first contact portion is located inside the other-end second contact portion in the radial direction,
the other-end first contact portion is located inside the one-end second contact portion in the radial direction,
the one-end second contact portion or the other-end second contact portion is a predetermined contact portion,
the predetermined contact portion includes a circumferential top portion that is located at a top end of the predetermined contact portion in the circumferential direction,
the predetermined contact portion includes a width in the radial direction, and
the circumferential top portion is offset radially inward from a center of the width in the radial direction.

7. The valve device according to claim 1, wherein
the seal ring is made of a resin.

8. A valve device comprising:
a passage forming portion defining therein a fluid passage through which a fluid flows and including a passage inner wall surface facing the fluid passage;
a valve element housed in the fluid passage and configured to open and close the fluid passage by rotating, the valve element having an outer circumferential end portion defining an outer circumferential groove;

an annular seal ring fit into the outer circumferential groove to seal a gap between the passage inner wall surface and the outer circumferential end portion of the valve element when the valve element fully closes the fluid passage, and a tension ring having an arc shape extending in a circumferential direction of the seal ring and biasing the seal ring in a direction to radially expand the seal ring, wherein the seal ring defines a side groove recessed in an axial direction of the seal ring and extending in the circumferential direction, the tension ring is fit into the side groove, the seal ring includes, as a joint, a one-end joint forming portion and an other-end joint forming portion, the one-end joint forming portion and the other-end joint forming portion being slidably overlapped each other to allow the seal ring to radially expand and contract, the one-end joint forming portion includes:
 a one-end first contact portion; and
 a one-end second contact portion located on one side of the one-end first contact portion in the axial direction and extending in the circumferential direction beyond the one-end first contact portion, the other-end joint forming portion includes:
 an other-end first contact portion configured to be in contact with the one-end second contact portion in a radial direction of the seal ring when the seal ring contracts; and
 an other-end second contact portion located on the other side of the other-end first contact portion in the axial direction and extending in the circumferential direction beyond the other-end first contact portion, the other-end second contact portion being configured to be in contact with the one-end first contact portion in the radial direction and to be in contact with the one-end second contact portion in the axial direction when the seal ring contracts, the one-end first contact portion is configured to separate from the other-end second contact portion when the seal ring expands, and an inner diameter of the tension ring at a timing the one-end first contact portion separates from the other-end second contact portion is less than an outer diameter of the outer circumferential end portion of the valve element.

9. A valve device comprising:

a passage forming portion defining therein a fluid passage through which a fluid flows and including a passage inner wall surface facing the fluid passage;

a valve element housed in the fluid passage and configured to open and close the fluid passage by rotating, the valve element having an outer circumferential end portion defining an outer circumferential groove;

an annular seal ring fit into the outer circumferential groove to seal a gap between the passage inner wall surface and the outer circumferential end portion of the valve element when the valve element fully closes the fluid passage, wherein the seal ring includes, as a joint, a one-end joint forming portion and an other-end joint forming portion, the one-end joint forming portion and the other-end joint forming portion being slidably overlapped with each other to allow the seal ring to radially expand and contract, the one-end joint forming portion includes:
 a one-end first contact portion; and
 a one-end second contact portion located on one side of the one-end first contact portion in an axial direction of the seal ring and extending in a circumferential direction of the seal ring beyond the one-end first contact portion, the other-end joint forming portion includes:
 an other-end first contact portion configured to be in contact with the one-end second contact portion in a radial direction of the seal ring when the seal ring contracts; and
 an other-end second contact portion located on the other side of the other-end first contact portion in the axial direction and extending in the circumferential direction beyond the other-end first contact portion, the other-end second contact portion being configured to be in contact with the one-end first contact portion in the radial direction and to be in contact with the one-end second contact portion in the axial direction when the seal ring contracts, the one-end first contact portion is configured to separate from the other-end second contact portion when the seal ring expands, and an inner diameter of the seal ring at a timing the one-end first contact portion separates from the other-end second contact portion is less than an outer diameter of the outer circumferential end portion of the valve element;

the valve device further comprises a tension ring having an arc shape extending in the circumferential direction and biasing the seal ring in a direction to radially expand the seal ring, the seal ring defines a side groove recessed in the axial direction and extending in the circumferential direction, the tension ring is fit into the side groove, and an inner diameter of the tension ring at the timing the one-end first contact portion separates from the other-end second contact portion is less than the outer diameter of the outer circumferential end portion of the valve element.

* * * * *